United States Patent Office 3,283,781
Patented Nov. 8, 1966

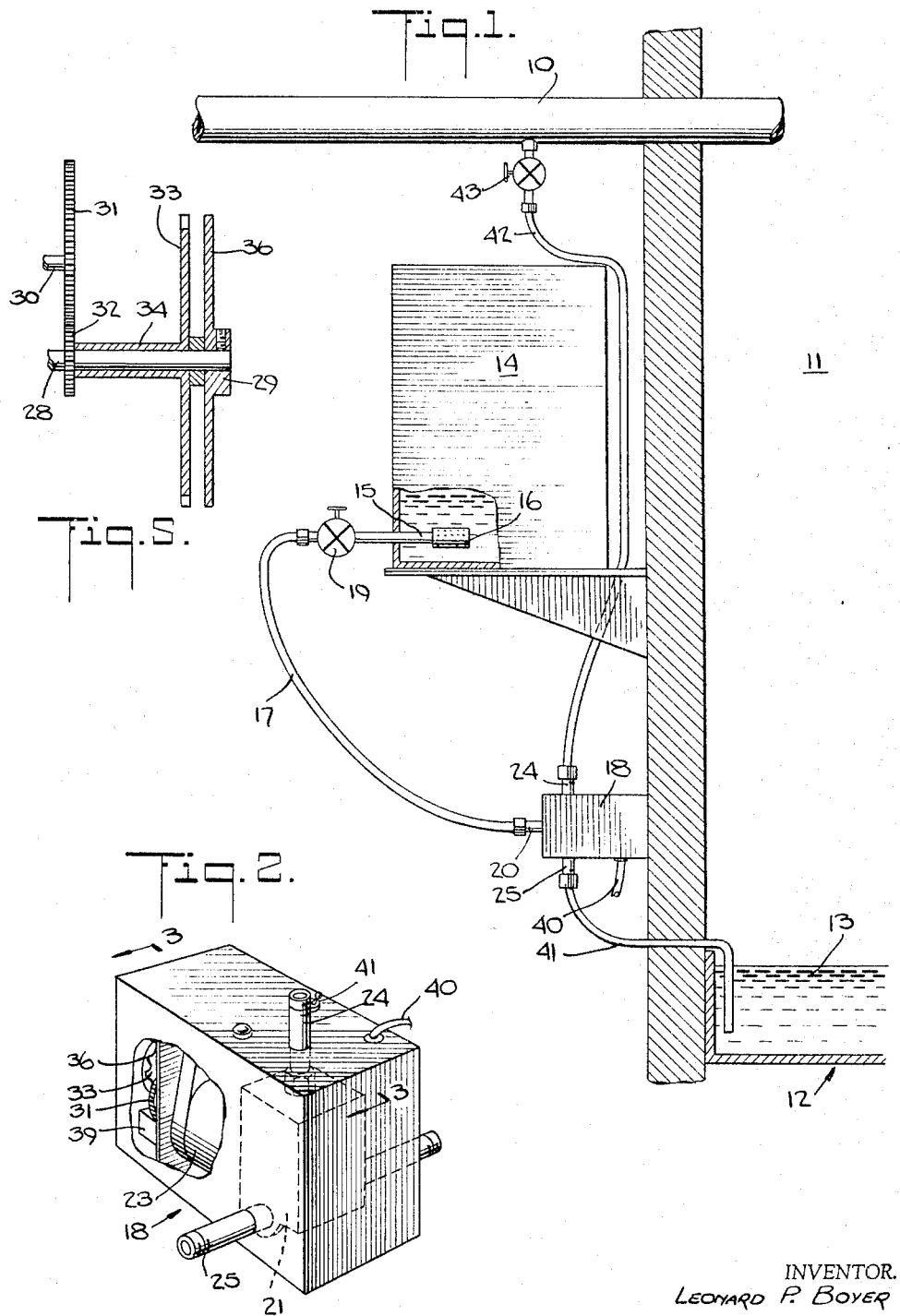

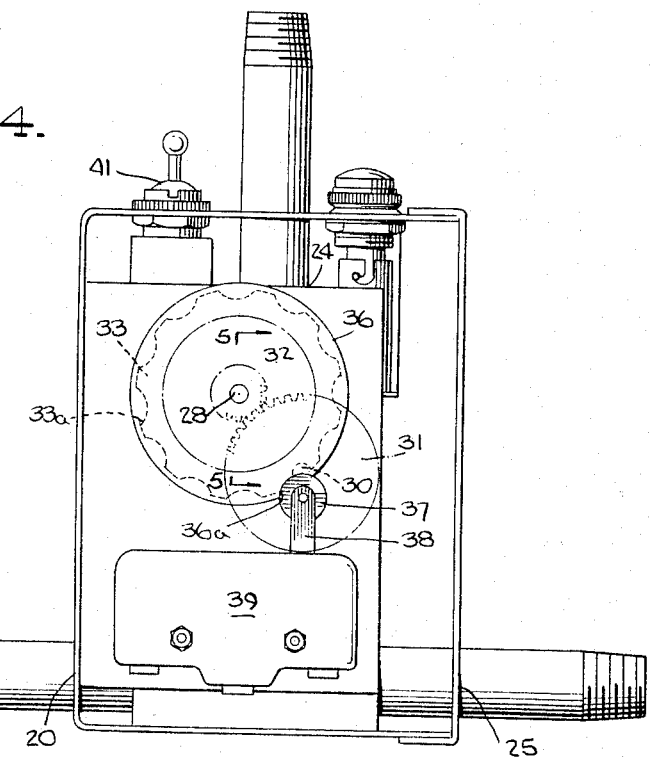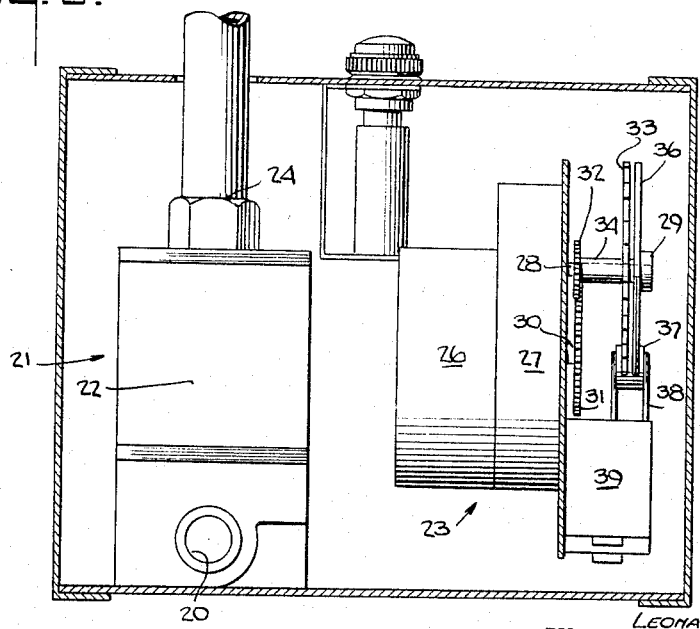

3,283,781
FEED VALVE DEVICE HAVING VALVE
FLUSHING MEANS
Leonard Philip Boyer, Cartaret, N.J., assignor to Alken-Murray Corporation, New York, N.Y., a corporation of New York
Filed Feb. 16, 1962, Ser. No. 173,649
4 Claims. (Cl. 137—624.17)

This invention relates to a water treatment system and more particularly is concerned with a valve for feeding predetermined quantities of a treatment chemical into the water.

Many types of equipment are cooled by a flow of cooling fluid. Water is one of the fluids most generally used as a coolant and because of restrictions on the use of water for cooling purposes and also due to the cost of obtaining large quantities of water in many locales, it is common practice to recirculate the cooling water so that it may be used repeatedly. After passing through the equipment and absorbing heat, the coolant is delivered to a heat exchanger which releases the heat to the atmosphere or some other heat sink. The coolant is then returned to the equipment for another passage. In many cases, reciprocating internal combustion engines, air compressors, air conditioners, etc., are cooled in this manner.

In operating equipment employing a recirculating cooling water system it is essential that the chemical condition of the water be monitored so that if it should become acid or alkaline, corrective action may be taken before there is damage to the equipment being cooled. The cooling water can change from a substantially neutral chemical condition to an acid or alkaline one because of leakage from the equipment being cooled and the addition of make-up water to overcome the losses which occur during operation. For a given installation, experience in operating the equipment indicates to the operator the rate at which the cooling water experiences a change in its chemical properties. With this knowledge it is possible for the operator to periodically add treatment chemicals to the cooling water in order to restore it to a neutral condition. However, leaving the control of the chemical condition of the water to the operator makes the whole treatment process rather uncertain. If the operator fails to add the proper amount of the chemicals at the proper time, the equipment being cooled may become rusted or clogged.

The present invention overcomes these disadvantages by providing a feed valve controlled by a timer to introduce treatment chemicals into the cooling water for a predetermined time cycle. Thus during the operation of the equipment the treatment chemical is periodically introduced in a predetermined quantity to the cooling water, so that it may be maintained in a neutral chemical condition. The feed valve device is provided with means for flushing it after the introduction of the treatment chemical so that the feed valve device and the passages related to it are not clogged by the treating chemical.

The primary object of the present invention is to provide a feed valve device for delivering a treating substance for a predetermined time cycle.

Another object of the present invention is to provide a feed valve device which is adaped to feed treating substances for any one of a plurality of selectable time periods.

An additional object of the present invention is to provide a feed valve device which can be flushed following the introduction of the treating substance.

A further object of the invention is to dispose the components of the feed valve device in such a way so as to obtain a compact arrangement.

Additional objects and features of the invention include structural details which are simple and economical to construct and which are trouble free to operate.

Briefly described, the present invention comprises a feed valve device adapted for applying a treatment substance to a fluid. The feed valve device includes a plurality of inlet passages and an outlet passage. At least one of the inlet passages is adapted to receive a flow of a treatment substance and at least one of the other inlet passages is adapted to receive a flow of a substance for flushing the valve. The valve device also includes means for selectively directing the flow of one of the treatment substances and the fluid for flushing the valve from the inlet passages to the outlet passage. In this way the flow of the substance through the valve after the flow of the treatment substance flushes the valve and prevents it from clogging.

In another embodiment of the invention there is provided means for actuating the means for selectively directing the flow from the inlet passages.

In still another embodiment of the invention the feed valve device includes means for actuating the means for selectively directing the flow from the inlet passages for predetermined time cycles.

In an additional embodiment of the invention the feed valve device includes a plurality of adjustable cams in conjunction with a follower which provide a source of a plurality of predetermined time periods.

In a further embodiment of the invention the feed valve device includes a plurality of timing cams disposed substantially parallel to each other to insure that a compact arrangement is obtained.

Other objects and advantages will become apparent from the following description taken in conjunction with the accompanying drawings in which:

FIG. 1 is a diagram of the recirculating cooling water system;

FIG. 2 is a perspective view of the feed valve and timer;

FIG. 3 is a front elevational view of the feed valve and timer showing the plurality of adjustable cams and the cam actuated switch;

FIG. 4 is a side elevational view of the timer and switch; and

FIG. 5 is an enlarged horizontal sectional view of the timer gears.

FIG. 1 illustrates a typical recirculating cooling water system. The cooling water after passing through and extracting heat from the equipment being cooled (not shown), returns through pipe 10 to heat exchanger 11. The cooling water from hot return pipe 10 passes downwardly through heat exchanger 11 and is collected in pan 12 from which the cooling water can be returned to the equipment. The system is charged with a sufficient quantity of water so that a level of water 13 may be maintained in the pan during operation. To insure a continuous flow of cooling water a recirculating pump (not shown) can be used between heat exchanger 11 and the equipment being cooled.

Adjacent to heat exchanger 11 there can be located tank 14 containing the treatment chemicals. Tank outlet 15 is provided with a strainer which is adapted to trap any particles of the treatment chemicals which could possibly obstruct the flow in the lines and equipment leading to the heat exchanger. Line 17 connects the treatment tank to feed valve device 18 at treatment inlet port 20. Valve 19 in line 17 enables the treatment tank to be isolated from the remainder of the system.

As shown in FIG. 2, feed valve device 18 includes three-way valve 21 operated by solenoid or actuating means 22. The actuation of the solenoid is controlled by timer 23. Feed valve device 18 contains water inlet port 24 and outlet port 25 (FIG. 4). The three-way valve 21 is adapted to selectively connect either the treatment inlet port to outlet port or the water inlet port to the outlet port. Within the inner portion of three-way valve 21 there is contained a means for directing the flow from one of the inlet ports to the outlet port for each condition. Solenoid 22 actuates the means within the valve which direct the flow (FIG. 3).

Timer 23 includes motor or prime mover 26 connected to gear transmission 27. Output shaft 28 of the gear transmission is coupled to collar 29 to which is attached front cam 36. Output shaft 30 is coupled to drive gear 31 which is in mesh with driven gear 32. Shaft 34 connects rear cam 33 to gear 32. In order to place the front and back cams along a common center of rotation, shafts 28 and 34 can be placed in a concentric arrangement (FIG. 5). The side-by-side arrangement of the cams enables the overall envelope of the feed valve device to be maintained at a minimum size.

As shown in FIG. 4, each of cams 33 and 36 can be provided with at least a single discontinuity or recess 33a and 36a, respectively, disposed along the operating portion or outer surface of the cams. Roller follower 37 pivotally mounted on actuating arm 38 of switch 39 is adapted to engage recesses 33a and 36a whenever they are in register with one another. For example, in one embodiment of the timer, gears 31 and 32 can be selected to drive front cam 36 at approximately 1028 revolutions per day and shaft 28 can be adapted to drive back cam 33 at approximately one revolution per hour. As shown in FIG. 4, front cam 36 can be provided with between one to twelve recesses 36a while back cam 33 can be provided with between one to twelve recesses 33a. With each of the cams having a number of recesses within the range set forth, it may be seen that the segments of the front and back cams will have a condition of registry of between one to twelve times during the time it takes a recess of back cam 33 to pass the location of roller follower 37. Thus there can be between one to one hundred and forty-four operations per hour of valve 22 to admit the treatment chemicals. As indicated above, roller follower 37 is adapted to engage the recesses of both cams whenever they are in register. The movement of roller follower 37 upon engaging both recesses operates switch 39 by the upward movement of actuating arms 38.

With the same gear ratios set forth above and with the front and back cams each having a single recess, it can be seen that in a 24 hour period there would be twenty-four conditions in which the recesses are in register with the result that switch 39 would be actuated twenty-four times during that period.

Power to feed valve device 18 is provided by cable 40 connected to switch 41. The operation of switch 41 connects the power source to motor 26 and through the contacts (not shown) of switch 39 to solenoid 22. Each actuation of switch 39 by the upward movement of roller follower 37 energizes solenoid 22 so that treatment inlet is connected to the outlet. As shown in FIG. 1 the actuation of the feed valve device by switch 39 enables the treatment chemicals to flow from tank 14, through line 17, and into line 41 which delivers the treatment fluid into heat exchanger 11.

After the actuation of the feed valve device during which the treatment chemicals were introduced into the water within pan 12, three-way valve 21 returns to its normal position in which water inlet port 24 is connected to outlet port 25. Water inlet port 24 can be connected to a source of fluid adapted to flush feed valve device 18 after it has introduced a flow of treating chemicals into the system. As shown in FIG. 1, water inlet port 24 may be connected by means of line 42 and valve 43 to hot return pipe 10. Thus, after a period during which the treating chemicals have passed through feed valve device 18, it is possible to introduce a flow of warm cooling water from hot return pipe 10 through the feed valve device and back into pan 12. The flow of the hot returning water insures that there is no build up of sediment or other deposits within the feed valve or line 41 connecting the valve to the pan of the heat exchanger.

OPERATION

For a given recirculating cooling water system it is assumed that the operator had determined the type of treating chemicals that are required for neutralizing the cooling water and also the approximate quantity of chemicals which must be added to the water over a given period of time. The characteristics of each model of the feed device for the pressure conditions under which the treating chemicals are to be delivered is known so that the selection of the number of actuations of the feed valve in a 24-hour period, for example, determines the quantity of chemical that is introduced into the cooling water. Once the quantity of fluid is determined, the operator can conveniently adjust the cams so that the required number of actuations are obtained. The cams can be fabricated from brittle material with break-out portions in order to form the required number of recesses in each of the cams. An additional adjustment of the device may be obtained by completely removing front cam 36 and leaving switch 39 merely under the control of back cam 33.

Treatment inlet port 20 is connected to treatment tank 14 and then it is necessary to connect a source of fluid to water inlet port 24 for the purpose of flushing the feed valve as well as line 41 between the feed valve and heat exchanger whenever the treating chemicals are not being introduced. A source of flushing fluid can be the returning cooling water which is on its way to heat exchanger 11 having passed through the equipment being cooled. After checking tank 14 for the proper level of treating chemicals, the operator then opens valves 19 and 43 to place the system in a condition ready for operation.

The operator then actuates switch 41 which energizes timer 23 so that the time cycles begin. Each time the individual gear trains connected to the front and back cams drive the cams to a position at which their recesses are in register, cam follower 37 moves into engagement with the recesses, thereby moving actuating arm 38 which controls switch 39. At this point switch 39 energizes solenoid 22 so that the flow of water from water inlet port 24 is terminated and the flow of treating chemicals from tank 14 through treatment port 20 begins.

After the predetermined period roller follower 37 is moved from its engaged position thereby causing the opening of switch 39 which terminates the energization of solenoid 22. The flow of treating chemicals then stops and the flow of hot return water from pipe 10 begins again through feed valve device 18 and line 41. The flow of hot return water flushes out the feed valve and line 41 so that it cannot be obstructed by deposits or sediments or the like from the previous flow of treating chemicals. To insure that the treatment chemicals are added whenever the recirculating cooling water system is in operation, the feed valve device can be connected to the same switching device (not shown) which serves to energize the recirculating pump (also not shown).

It can be seen from the above description that the present invention provides a device for feeding predetermined amounts of treatment chemicals into a cooling water system for predetermined periods, and means for flushing the feeding system after the treatment chemicals have been delivered. Although various embodiments of the invention have been shown and described herein, it is understood that certain changes and additions within the scope of the appended claims may be made by those skilled in the art without departing from the scope and spirit of this invention.

I claim:
1. A feed valve device adapted for delivering at least a first fluid to a receiving area comprising structure forming a plurality of inlet passages and an outlet passage, at least one of said inlet passages being adapted to receive a flow of the first fluid, at least one other of said inlet passages being adapted to receive a flow of a second fluid for flushing said valve, said outlet passages being adapted to deliver the flow from said plurality of inlet passages to the receiving area, and means for selectively connecting a different one of said plurality of inlet passages to said outlet passage to direct the flow of one of the first fluid and the second fluid from at least one of said inlet passages to said outlet passage, means for actuating said connecting means, a plurality of cams positioned adjacent to one another, means for driving each of said plurality of cams at a different predetermined speed so that said plurality of cams move relative to one another, a follower having a common surface portion disposed adjacent the operating portion of said plurality of cams and adapted for movement in response to the movement of said plurality of cams, and means for activating said actuating means in response to the movement of said follower with respect to said plurality of cams, whereby said plurality of cams control the selective connecting of said plurality of inlet passages to said outlet passage in predetermined time cycles.

2. A feed valve device in accordance with claim 1 in which each of said plurality of cams includes at least one discontinuity along said operating portion, said follower being adapted to move into engagement with a discontinuity in each of said plurality of cams when the discontinuities of said plurality of cams are in register with one another, whereby said activating means responds to the movement of said follower.

3. A feed valve device in accordance with claim 2 in which each of said plurality of cams are positioned adjacent one another along a substantially common axis of rotation and include at least one discontinuity along said operating portion and in which the common surface of said follower is disposed substantially parallel to said axis of rotation.

4. A feed valve device in accordance with claim 2 in which said means for activating said actuating means includes a switching means connected to said actuating means.

References Cited by the Examiner
UNITED STATES PATENTS

| | | | |
|---|---|---|---|
| 2,437,401 | 3/1948 | Nilson | 74—54 |
| 2,604,114 | 7/1952 | Rogers | 137—604 |
| 2,746,465 | 5/1956 | Farison | 134—169 |
| 2,832,408 | 4/1958 | Manning | 74—54 |
| 2,937,845 | 5/1960 | La Rocque et al. | 251—14 |
| 2,957,484 | 10/1960 | Nordin | 137—1 |

OTHER REFERENCES

Powell: Water Conditioning for Industry, 1954, first edition, McGraw-Hill, New York, pp. 270, 271 and 452–455.

MORRIS O. WOLK, *Primary Examiner.*

ISADOR WEIL, *Examiner.*

A. COHAN, M. E. ROGERS, *Assistant Examiners.*